United States Patent [19]

Miyata

[11] Patent Number: 5,422,092

[45] Date of Patent: * Jun. 6, 1995

[54] FLAME RETARDANT AND FLAME-RETARDANT RESIN COMPOSITION

[75] Inventor: Shigeo Miyata, Takamatsu, Japan

[73] Assignee: Kabushiki Kaisha Kaisui Kagaku Kenkyujo, Fukuoka, Japan

[*] Notice: The portion of the term of this patent subsequent to Jul. 5, 2011 has been disclaimed.

[21] Appl. No.: 173,064

[22] Filed: Dec. 27, 1993

[51] Int. Cl.⁶ .............................................. C01F 11/00
[52] U.S. Cl. .................................... 423/635; 423/593; 423/594; 423/599; 423/604; 423/605; 423/622; 423/632
[58] Field of Search ....................... 106/18.26; 423/635, 423/593, 594, 599, 604, 605, 622, 632

[56] References Cited

U.S. PATENT DOCUMENTS

| | | | |
|---|---|---|---|
| 3,879,523 | 4/1975 | Miyata et al. | 423/595 |
| 3,879,525 | 4/1975 | Miyata et al. | 423/595 |
| 4,360,624 | 11/1982 | Huang et al. | 524/411 |
| 5,264,284 | 11/1993 | Miyata | 423/635 |
| 5,326,549 | 7/1994 | Miyata | 423/594 |

FOREIGN PATENT DOCUMENTS

| | | |
|---|---|---|
| 0541329 | 5/1993 | European Pat. Off. |
| 0561547 | 9/1993 | European Pat. Off. |
| 319827 | 11/1991 | Japan |

OTHER PUBLICATIONS

Database WPI, AN 297846, (20 Aug. 1993), corresponding to JP-A-5 209 084.
Database WPI, AN 185282, (7 Jul. 1993), corresponding to JP-A-5 112 669.

*Primary Examiner*—Anthony Green
*Attorney, Agent, or Firm*—Wenderoth, Lind & Ponack

[57] ABSTRACT

A composite metal hydroxide is provided for use as a flame-retardant in a resin or rubber composition. The composite metal hydroxide is a solid solution having the formula (1) $Ca_{1-x}M^{2+}{}_x(OH)_2$. M is at least one member selected from the group consisting of Mg, Mn, Fe, Co, Ni, Cu and Zn and x is in the range of $0.001 \leq x < 0.995$. Two preferred composite metal hydroxides have the formula (2) $Ca_{1-x}Mg^{2+}{}_x(OH)_2$ wherein x is in the range of $0.001 \leq x < 0.995$ and the formula (3) $Ca_{1-x}(Mg, Ni, Mn)_x(OH)_2$ wherein x is in the range of $0.001 \leq x < 0.995$

3 Claims, No Drawings

FLAME RETARDANT AND FLAME-RETARDANT RESIN COMPOSITION

BACKGROUND OF THE INVENTION

1. Field of the Invention

The present invention relates to a flame retardant and a flame-retardant resin and/or rubber composition containing said flame retardant. More specifically, it relates to a flame retardant which exhibits excellent flame retardancy resin and/or composition containing said flame retardant.

2. Description of Related Art

The requirement of flame retardancy for a resin and rubber (to be simply referred to as "resin" hereinafter) is getting more stringent year after year. For satisfying this requirement, there is conventionally employed a method in which a so-called halogen-containing flame retardant, typified by a combination of an organic halide and antimony trioxide, is incorporated into a resin. However, the following problems of a halogen-containing flame retardant have come to be recognized. It is liable to generate halogen gas during the processing, and it corrodes an apparatus, etc. When combusted, it generates a large amount of toxic smoke to threaten human life, and it corrodes peripheral equipment to terminate the function of the equipment.

Aluminum hydroxide and magnesium hydroxide contain no halogen and are free from the above problems. These hydroxides are attracting attention, and the consumption thereof is increasing year after year. Since, however aluminum hydroxide starts dehydration at about 190° C., it makes almost all resins foam in processing, and deteriorates their product value. The temperature for the processing is therefore required to be lowered than the above temperature, and the resins to which aluminum hydroxide can be incorporated are limited in kind.

Magnesium hydroxide starts dehydration around 340° C., and it can therefore be used with almost all resins without the foaming problem. Further, the present inventor and some other coinventors have invented a magnesium hydroxide suitable as a flame retardant and a process for the production thereof. Magnesium hydroxide is thus beginning to be a mainstream in the field of halogen-free flame retardants. However, for imparting a resin with sufficient flame retardancy, magnesium hydroxide is required to be used in a large amount as well as aluminum hydroxide. For example, the amount of magnesium hydroxide required per 100 parts by weight of a resin is about 150 parts by weight or more. Further, magnesium hydroxide is relatively expensive, and it hence increases the cost much more than a halogen-containing flame retardant. The use of magnesium hydroxide which is a safe flame retardant is not necessarily satisfactorily expanding.

SUMMARY OF THE INVENTION

It is an object of the present invention to provide a flame retardant having excellent flame retardancy, which can overcome the problems of magnesium hydroxide in its relatively high price and the requirement of a large amount for imparting a resin with sufficient flame retardancy, and which can be produced at a relatively low cost.

It is another object of the present invention to provide a flame retardant which can be produced at a relatively low cost and has excellent flame retardancy.

It is still another object of the present invention to provide a flame-retardant resin composition containing said flame retardant.

According to the present invention, the above objects and advantages of the present invention are achieved, first, by a composite metal hydroxide of the formula (1) which is a solid solution and is for use as a flame retardant for a resin or rubber, $$Ca_{1-x}M^{2+}_x(OH)_2 \qquad (1)$$

wherein M is at least one member selected from the group consisting of Mg, Mn, Fe, Co, Ni, Cu and Zn and x is in the range of $0.001 \leq x < 0.995$, preferably $0.005 \leq x < 0.99$, more preferably $0.01 \leq x \leq 0.7$, particularly preferably $0.04 \leq x < 0.5$.

Further, according to the present invention, the above objects and advantages of the present invention are achieved, second, by a composite metal hydroxide of the formula (2) for use as a flame retardant for a resin or rubber, $$Ca_{1-x}Mg^{2+}_x(OH)_2 \qquad (2)$$

wherein x is in the range of $0.001 \leq x < 0.995$, preferably $0.005 \leq x < 0.99$, more preferably $0.01 \leq x \leq 0.7$, particularly preferably $0.04 \leq x < 0.5$, which composite metal hydroxide is at least one of a calcium hydroxide-based solid solution, a mixture of a calcium hydroxide-based solid solution with a magnesium hydroxide-based solid solution and a magnesium hydroxide-based solid solution.

Further, according to the present invention, the above objects and advantages of the present invention are achieved, third, by a composite metal hydroxide of the formula (3) for use as a flame retardant for a resin or rubber, $$Ca_{1-x}(Mg, Ni, Mn)_x(OH)_2 \qquad (3)$$

wherein x is in the range of $0.001 \leq x < 0.995$, preferably $0.005 \leq x < 0.99$, more preferably $0.01 \leq x \leq 0.7$, particularly preferably $0.04 \leq x < 0.5$, which composite metal hydroxide necessarily contains Ni and/or Mn and is at least one of a calcium hydroxide-based solid solution, a mixture of a calcium hydroxide-based solid solution with a magnesium hydroxide-based solid solution and a magnesium hydroxide-based solid solution.

Further, according to the present invention, there is provided a flame-retardant resin and/or rubber composition containing 100 parts by weight of a resin and/or a rubber and 20 to 250 parts by weight of the composite metal hydroxide of the above formula (1).

DETAILED DESCRIPTION OF THE INVENTION

The present inventor has focused on calcium hydroxide as a flame retardant which can overcome the price problem of magnesium hydroxide used as a flame retardant. Calcium hydroxide is very cheap, there is an abundant supply of its source and it is safe to a human body. However, calcium hydroxide has a dehydration temperature of about 540° C., and this hydration temperature is much higher than decomposition temperatures of resins and rubbers. As a result, the flame retardancy of calcium hydroxide is very poor, and further, its acid resistance is also very poor. For example, calcium hydroxide has a problem in that it gradually reacts with carbon dioxide gas in air to form calcium carbonate or it is dissolved in water with pH of 12 or less. Therefore, calcium hydroxide has never been considered useful as a flame retardant.

It has been found that the calcium hydroxide solid solution of the formula (3) invented by the present inventor (Japanese Patent Application No. 319827/1992) surprisingly overcomes the above problems of calcium hydroxide and shows improved flame retardancy and acid resistance.

$$Ca_{1-x}M_1^{2+}{}_x(OH)_2 \qquad (4)$$

wherein $M_1$ is at least one member selected from the group consisting of Mg, Mn, Fe, Co, Ni, Cu and Zn, and x is in the range of $0.005 \leq x < 0.4$.

Further, when $M_1$ in the formula (4) is magnesium and when x in the formula (4) is 0.4 or more, i.e., exceeds the range in which a calcium hydroxide solid solution alone is formed, "magnesium hydroxide" is formed in addition to the calcium hydroxide solid solution. It has been found that the so-formed "magnesium hydroxide" is a solid solution of calcium hydroxide in magnesium hydroxide. It is expected that the dehydration and decomposition temperature of the above magnesium hydroxide solid solution is higher than the dehydration and decomposition temperature, about 420° C., of magnesium hydroxide. However, it has been surprisingly found that the dehydration and decomposition temperature of the above magnesium hydroxide solid solution is lower than that of magnesium hydroxide by about 60° C. in the maximum value.

It has been further found that a mixture system of the calcium hydroxide-based solid solution and the magnesium hydroxide-based solid solution exhibits flame retardancy equal to or higher than that of magnesium hydroxide. The reason therefor is not clear, while the flame retardancy is considered to be improved for the following reasons.

The calcium hydroxide solid solution is dehydrated/decomposed at a temperature lower than the dehydration and decomposition temperature of calcium hydroxide by approximately 40° to 50° C. The magnesium hydroxide-based solid solution is dehydrated/decomposed at a temperature lower than the dehydration and decomposition temperature of magnesium hydroxide by about 60° in the maximum value. The dehydration temperatures of the calcium hydroxide-based solid solution and the magnesium hydroxide-based solid solution are nearer to the ignition temperatures of a resin and a rubber than the dehydration temperatures of calcium hydroxide and magnesium hydroxide are, and the heat generated by a resin and a rubber can be effectively absorbed. The flame retardant which is the composite metal hydroxide of the formula (1) or the solid solution of the formula (2) has excellent flame retardancy over calcium hydroxide, but also, when it contains magnesium, has excellent flame retardancy over magnesium hydroxide in some cases.

The flame retardant of the present invention has another advantage in that it is formed mainly from a less expensive and abundant raw material and can be produced by a relatively facile method. That is, calcium hydroxide itself easily undergoes crystal growth, and a larger size of the crystal is suitable as a flame retardant. The flame retardant of the present invention shows improved acid resistance over calcium hydroxide, since $M(OH)_2$ contained in the calcium hydroxide-based solid solution has excellent acid resistance over calcium hydroxide. In particular, this tendency remarkably appears when the calcium hydroxide-based solid solution contains nickel hydroxide.

The composite metal hydroxide of the formula (1) is a solid solution formed of calcium hydroxide and $M(OH)_2$, a mixture of said solid solution with a magnesium hydroxide-based solid solution, or a solid solution formed of magnesium hydroxide, Ca and $M(OH)_2$. When the composite metal hydroxide consists of the calcium hydroxide-based solid solution, or when it is consists of magnesium hydroxide-based solid solution, the diffraction angle in X-ray powder diffraction pattern varies to a slight extent depending upon the ionic radius and content of M, while the X-ray diffraction pattern is substantially the same as that of calcium hydroxide or magnesium hydroxide. When the composite metal hydroxide consists of both the calcium hydroxide-based solid solution and the magnesium hydroxide-based solid solution, the diffraction angle similarly varies to a slight extent depending upon the ionic radius and content of $M(OH)_2$, while the diffraction pattern is substantially the same as those of calcium hydroxide and magnesium hydroxide. When the composite metal hydroxide consists of the calcium hydroxide-based solid solution, the differential thermal analysis (DTA) thereof shows one endothermic peak, and the peak is lower than the peak, 536° C., of calcium hydroxide by approximately 40° to 50° C. in the maximum value. When the composite metal hydroxide consists of the calcium hydroxide-based solid solution and the magnesium hydroxide-based solid solution, DTA shows two endothermic peaks corresponding to those of calcium hydroxide and magnesium hydroxide, and the peaks shift toward lower temperatures respectively as compared with the peaks of calcium hydroxide and magnesium hydroxide.

When the composite metal hydroxide consists of the calcium hydroxide-based solid solution and either $M(OH)_2$ other than magnesium hydroxide or a solid solution of $M(OH)_2$ with $Ca(OH)_2$ other than magnesium hydroxide, DTA shows two endothermic peaks. In this case, the endothermic peak corresponding to that of $M(OH)_2$ overlaps the processing temperature of a resin or a rubber, and foaming may occur. In some cases, therefore, the co-presence of a solid solution of $M(OH)_2$ other than magnesium hydroxide is not preferred. The co-presence of the calcium hydroxide-based solid solution and the magnesium hydroxide-based solid solution causes no foaming at processing temperatures of almost all resins and rubbers. With an increase in the content of the magnesium hydroxide-based solid solution, the flame retardancy tends to be improved. However, when x exceeds about 0.7, the crystal growth of the calcium hydroxide-based solid solution tends to be prevented to some extent.

In the composite metal hydroxide of the present invention, the size of the crystal is preferably 0.2 to 4 μm, more preferably 0.4 to 4 μm, and the composite metal hydroxide is preferably almost free of secondary aggregation or the degree of secondary aggregation is quite low. In this connection, the size of secondary particles is preferably almost the same as the size of the crystal. The BET specific surface area of the composite metal hydroxide of the present invention is preferably 1 to 20 m²/g, more preferably 3 to 10 m²/g. The above properties are required to be in the above ranges for obtaining a resin and/or rubber composition which is excellent in processability, appearance, mechanical strength and flame retardancy.

The composite metal hydroxide of the present invention may be used directly as a flame retardant, or before use, it may be surface-treated with at least one member selected from the group consisting of higher fatty acid, an anionic surfactant, phosphate ester, a coupling agent (silane-, titanate- or aluminum-containing coupling agent), a polyhydric alcohol and fatty acid ester.

The surface-treating agent preferably includes higher fatty acids having at least 10 carbon atoms such as stearic acid, erucic acid, palmitic acid, lauric acid and behenic acid; alkali metal salts of the above higher fatty acids; sulfates of higher alcohols such as steryl alcohol and oleyl alcohol; anionic surfactants such as sulfates of polyethylene glycol ether, amidated sulfate, ester-bonded sulfate, ester-bonded sulfonate, amidated sulfonate, ether-bonded sulfonate, ether-bonded alkylallysulfonate, ester-bonded alkylallysulfonate and amidated alkylallylsulfonate; phosphate esters such as monoester or diester of orthophosphoric acid and oleyl alcohol or stearly alcohol, a mixture of these esters, and acid-form esters, metal salts or amine salts of these esters; silane-containing coupling agents such as vinyl ethoxysilane, vinyl triethoxysilane, vinyl tris(2-methoxyethoxy)silane, gamma-methacryloxypropyltrimethoxysilane, gamma-aminopropyltrimethoxysilane, beta-(3,4-epoxycyclohexyl)ethyltrimethoxysilane, gamma-glycidoxypropyltrimethoxysilane and gamma-mercaptopropyltrimethoxysilane; titanate-containing coupling agents such as isopropyltriisostearoyl titanate, isopropyltris(dioctylpyrophosphate)titanate, isopropyltri(N-aminoethylaminomethyl)titanate and isopropyltridecylbeznenesulfonyl titanate; aluminum-containing coupling agents such as acetoalkoxyaluminum diisopropylate; and esters of polyhydric alcohol and fatty acid such as glycerin monostearate and glycerin monooleate.

The composite metal hydroxide of the present invention can be surface treated by a wet or dry method known per se. For example, the wet method may be carried out by the above surface treating agent in the form of a liquid or an emulsion is added to a slurry of the composite metal hydroxide and the mixture is mechanically fully stirred at a temperature up to about 100° C. the dry method may be carried out by adding the surface treating agent in the form of a liquid, an emulsion or a solid to the composite metal hydroxide while a powder of the composite metal hydroxide is fully stirred with a mixer such as a Henschel mixer and fully stirring the mixture under heat or no heat. The amount of the surface treating agent is properly determined as required, while the amount thereof based on the weight of the composite metal hydroxide is preferably approximately 0.1 to 10% by weight. After the heat treatment, the composite metal hydroxide is, for example, properly washed with water, filtered, granulated, dried, milled and classified to obtain a final product.

For producing the composite metal hydroxide of the present invention, various methods can be employed. For example, it can be produced by a co-precipitation method in which an aqueous solution containing calcium ion and M ion is prepared and an alkali in an amount nearly equaling the total equivalent of the calcium and M is added to the aqueous solution with stirring to precipitate a composite metal hydroxide. Further, it can be produced by a method in which a solid solution of calcium oxide and MO is subjected to a hydration reaction. It can be also produced by another method in which a slurry containing calcium oxide and/or calcium hydroxide and an aqueous solution containing M ion are mixed and allowed to react. Further, it can be also produced by a sol-gel method in which alcoholates of calcium and M is hydrolyzed. For promoting further crystal growth and decreasing secondary aggregation, the composite metal hydroxide obtained by any one of the above method is preferably hydrothermally treated in an autoclave at approximately 110° to 250° C. for about 1 hour while reaction mother liquor is co-present or after a salt such as $CaCl_2$, $CaBr_2$, $NH_4Cl$, $NaCl$ or $KCl$ is added as a crystal growth promoter.

The source for calcium for forming the composite metal hydroxide includes calcium oxide (quick lime), calcium hydroxide (slaked lime), calcium chloride, calcium nitrate, calcium bromide, calcium iodide, calcium acetate and alcoholates such as calcium ethoxide and calcium propoxide. The source for M ion includes chlorides, bromides, iodides, fluorides, nitrates, formates and alcoholates such as propioxides, ethoxides, propoxides and isopropoxides of divalent metals such as $Mg^{2+}$, $Mn^{2+}$, $Fe^{2+}$, $Co^{2+}$, $Ni^{2+}$, $Cu^{2+}$ and $Zn^{2+}$, bittern, seawater and underground brine.

The alkali used for forming the composite metal hydroxide includes calcium hydroxide, calcium oxide, sodium hydroxide and potassium hydroxide.

The resin and rubber used in the present invention includes thermoplastic resins such as a copolymer of vinyl chloride and ethylene, propylene or vinyl acetate, a copolymer of chlorinated polyethylene, polyethylene or ethylene and other alpha-olefin, a copolymer of ethylene and vinyl acetate, ethyl acrylate or methyl acrylate, polypropylene, a copolymer of propylene and other alpha-olefin, polybutene-1, polystyrene, a copolymer of styrene and acrylronitrile, a copolymer of ethylene and hexene or octene, polyacrylate, polymethacrylate, polyurethane, polyether, polyester and polyamide, thermosetting resins such as a phenolic resin, a melamine resin, an epoxy resin, an unsaturated polyester resin an alkyd resin, EPDM, SBR, NBR, butyl rubber, chloprene rubber, isoprene rubber, chlorosulfonated and polyethylene.

In the resin and/or rubber composition of the present invention, the amount of the composite metal hydroxide is properly selected depending upon the kind of the resin and/or rubber and the kind of the composite metal hydroxide, while the amount of the surface-treated or surface-untreated composite metal hydroxide per 100 parts by weight of the resin and/or rubber is approximately 20 to 250 parts by weight, preferably approximately 50 to 200 parts by weight. When the amount of the composite metal hydroxide is smaller than the above lower limit, the flame retardancy is insufficient. When the above amount exceeds the about upper limit, for example, there may be disadvantages that the tensile strength and Izod impact strength decrease, or that the acid resistance deteriorates.

The resin and/or rubber and the composite metal hydroxide can be mixed and kneaded by any means by which these components can be homogeneously mixed. For example, a single-screw extruder, a twin-screw extruder, a roll or a Banbury mixer may be employed. The resin and/or rubber composition can be molded by any molding method know per se depending upon the kind of the resin and/or rubber and the kind of an intended molded article. For example, it can be molded by any one of an injection molding method, an extrusion molding method, a blow molding method, a press forming method, a rotary molding method, a calender molding method, a sheet forming method, a transfer molding method, laminate forming method and a vacuum molding method.

The resin and/or rubber composition of the present invention may contain at least one of various additives as required in addition to the composite metal hydroxide of the present invention. These additives are flame retardant aids such as a carbon powder, ferrocene, anthracene, polyacetylene, red phosphorus, an acrylic fiber, nickel oxide, fibrous magnesium hydroxide and fibrous composite metal hydroxide of the formula $Mg_{1-x}M_3{}^{2+}{}_x(OH)_2$ in which $M_3$ is at least one member selected from Mn, Fe, Co, Ni, Cu and Zn and x is a number in the range of $0.005 < x < 0.5$ (Japanese Patent Application No. 162203/1991). The amount of the above flame retardant aid per 100 parts by weight of the resin and/or rubber is preferably approximately 0.01 to 10 parts by weight. Further, other additive may be incorporated as a lubricant and an improver for water resistance and acid resistance (resistance to whitening). These additives include zinc behenate, magnesium behenate, zinc stearate, calcium stearate, magnesium stearate, zinc stearate and aluminum stearate. The amount of the above "other additive" per 100 parts by weight of the resin and/or rubber is preferably approximately 0.1 to 10 parts by weight.

In addition to the above additives, the flame retardant resin composition of the present invention may contain other additives such as antioxidant, an ultraviolet shielding agent, an antistatic agent, a pigment, an antifoamer, a plasticizer, a filler, a reinforcing agent, an organic halogen flame retardant and a crosslinking agent.

As specified above, the present invention provides a flame retardant which is less expensive and is excellent in flame retardancy and a flame-retardant resin and/or rubber composition containing said flame retardant.

The present invention will be detailed hereinafter with reference to Examples.

EXAMPLE 1

20 Liters of a $Ca(OH)_2$ slurry prepared by slaking quick lime and sieving the slake lime through a 200-mesh sieve was placed in a 50-liter reactor, and while the slurry was stirred around 70° C., 3.2 liters of an aqueous solution containing 1.0 mol/l of magnesium chloride was added and reacted with the slurry. The reaction mixture was placed in an autoclave, and treated at 120° C. for 2 hours. Then, the reaction product (composite metal hydroxide) was recovered by filtration, washed with water and dispersed in water. The dispersion was heated up to 70° C., and an aqueous solution (about 70° C.) of pre-dissolved sodium oleate was added with stirring, to surface-treat the reaction product. The amount of the sodium oleate based on the weight of the resulting product was 2% by weight. Then, the surface-treated composite metal hydroxide was recovered by filtration, washed with water, dehydrated, granulated and dried. Separately, part of the slurry before the surface treatment was taken, dehydrated and dried, and the remainder was measured for a composition by a chelatometric titration method, for a crystal structure by X-ray diffractometry, and for a BET specific surface area by a liquid nitrogen adsorption method. Further, the same remainder as above was ultrasonically dispersed in ethyl alcohol as a dispersing medium for about 5 minutes and measured for an average secondary particle diameter by a microtrack method. Table 1 shows the results.

100 Parts by weight of impact-resistant polypropylene, 0.2 part by weight of an antioxidant (0.1 part by weight of Irganox 1010 and 0.1 part by weight of Weston 626) and the composite metal hydroxide in an amount shown in Table 1 were uniformly mixed, and the mixture was kneaded with a twin-screw extruder at about 230° C. to obtain composite pellets. The pellets were dried with a vacuum dryer at 120° C. for 2 hours, and then injection molded at about 230° C. to obtain test pieces. The test pieces were evaluated for flammability, mechanical strength and appearance. Table 1 shows the results. For the evaluation of the flammability, the test piece having a thickness of ⅛ inch was evaluated according to UL-94. The above-obtained composite metal hydroxide had the following chemical composition.

$$Ca_{0.91}Mg_{0.09}(OH)_2$$

EXAMPLES 2 AND 3

Example 1 was repeated except that the aqueous solution containing 1.0 mol/l of magnesium chloride was replaced with an aqueous solution containing 2.0 mol/l of magnesium chloride, that the amount of the aqueous solution was changed to 7.0 liters (Example 2) or 12.0 liters (Example 3), and that the temperature for hydrothermally treating the reaction product was changed to 170° C. Table 1 shows the results. The above-obtained composite metal hydroxide had the following chemical composition.

Example 2 $Ca_{0.64}Mg_{0.36}(OH)_2$

Example 3 $Ca_{0.40}Mg_{0.60}(OH)_2$

EXAMPLE 4

A composition metal hydroxide was obtained in the same manner as in Example 1 except that the aqueous solution containing 1.0 mol/l of magnesium chloride was replaced with 3.2 liters of a zinc nitrate/nickel nitrate mixed aqueous solution ($Zn^{2+} = 0.75$ mol/l, $Ni^{2+} = 0.25$ mol/l, 30° C.). The so-obtained composite metal hydroxide was placed in an autoclave, hydrothermally treated at 170° C. for 2 hours, recovered by filtration, washed with water, dried and milled. The composite metal hydroxide was surface-treated with 1% by weight of gamma-aminopropyltrimethoxysilane. Test pieces were prepared, and evaluated, in the same manner as in Example 1. Table 1 shows the results. The above-obtained composite metal hydroxide had the following chemical composition.

$$Ca_{0.92}Zn_{0.06}Ni_{0.02}(OH)_2$$

EXAMPLE 5

A composite metal hydroxide was obtained in the same manner as in Example 1 except that the aqueous solution containing 1.0 mol/l of magnesium chloride was replaced with 8.0 liters of a cupric nitride/nickel nitrate mixed aqueous solution ($Cu^{2+} = 0.75$ mol/l, $Ni^{2+}=0.25$ mol/l, 30° C.). The so-obtained composite metal hydroxide was treated in the same manner as in Example 4. Test pieces were prepared, and evaluated, in the same manner as in Example 1. Table 1 shows the results. The above-obtained composite metal hydroxide had the following chemical composition.

$$Ca_{0.80}Cu_{0.15}Ni_{0.05}(OH)_2$$

EXAMPLE 6

10 Liters of a magnesium chloride/calcium chloride mixed aqueous solution ($Mg^{2+}=2.0$ mol/l, $Ca^{2+}=1.0$ mol/l, 30° C.) was placed in a 25-liter reactor, and while the mixed aqueous solution was stirred, 11 liters of a slurry containing 2 mol/l of slaked lime (20° C.) was added and allowed to react with the aqueous solution. The reaction mixture was placed in an autoclave and hydrothermally treated at 180° C. for 4 hours. The reaction product was recovered by filtration, washed with water and dispersed in water. Thereafter, the reaction product was treated in the same manner as in Example 1, and test pieces were prepared and evaluated in the same manner as in Example 1. Table 1 shows the results. The above-obtained composite metal hydroxide had the following chemical composition.

$$Ca_{0.02}Mg_{0.98}(OH)_2$$

EXAMPLE 7

12 Liters of a calcium chloride/manganese chloride/nickel chloride mixed aqueous solution ($Ca^{2+}=2.0$ mol/l, $Mn^{2+}=0.1$ mol/l, $Ni^{2+}=0.05$ mol/l, 30° C.) from which oxygen had been removed by blowing in nitrogen gas and 12 liters of an aqueous solution containing 4 mol/l of NaOH from which oxygen had been removed by blowing in nitrogen gas were charged into a 25-liter reactor containing 1 liter of oxygen-free water at a flowing rate of 200 ml/minute, respectively, with a quantitative pump, and the resultant mixture was allowed to react with stirring. Then, the reaction mixture was placed in an autoclave, and hydrothermally treated at 180° C. for 2 hours. The reaction product was recovered by filtration, washed with water and dispersed in water and surface-treated with 1% by weight, as a solid, of lauroyl sarcosine at about 60° C. with stirring. Then, the surface-treated product (composite metal hydroxide) was recovered by filtration, washed with water and dried. The above procedures were all carried out under nitrogen gas atmosphere. The above-obtained composite metal hydroxide in an amount shown in Table 2 was mixed with 100 parts by weight of nylon 6 shown in Table 2 and test pieces were prepared from this mixture, and evaluated, in the same manner as in Example 1. Table 2 shows the results. The composite metal hydroxide had the following chemical composition.

$$Ca_{0.85}Mn_{0.10}Ni_{0.05}(OH)_2$$

EXAMPLE 8

Test pieces were prepared in the same manner as in Example 7 except that the mixed aqueous solution was replaced with 12 liters of a calcium chloride/magnesium chloride/nickel chloride mixed aqueous solution ($Ca^{2+}=2.0$ mol/l, $Mg^{2+}=0.8$ mol/l, $Ni^{2+}=0.09$ mol/l, 40° C.). The test pieces were evaluated in the same manner as in Example 7. Table 2 shows the results.

The composite metal hydroxide had the following chemical composition.

$$Ca_{0.55}Mg_{0.40}Ni_{0.05}(OH)_2$$

Comparative Example 1

Test pieces were prepared in the same manner as in Example 1 except that the aqueous solution containing magnesium chloride was replaced with 7.2 liters of an aqueous solution containing 1.0 mol/l of nickel chloride. The test pieces were evaluated in the same manner as in Example 1. Table 1 shows the results. The so-obtained compound had the following chemical composition.

$$Ca_{0.80}Ni_{0.20}(OH)_2$$

Comparative Example 2

The same slurry of calcium hydroxide as that used in Example 1 was surface-treated in the same manner as in Example 1, and test pieces were prepared, and evaluated, in the same manner as in Example 1. Table 1 shows the results. The calcium hydroxide had the chemical composition of $Ca(OH)_2$.

Comparative Example 3

Test pieces were prepared in the same manner as in Example 1 except that the composite metal hydroxide was replaced with commercially available magnesium hydroxide (surface-treated with 2% by weight of sodium oleate) for use as a flame retardant. The test pieces were evaluated in the same manner as in Example 1. Table 1 shows the results. The above magnesium hydroxide had the chemical composition of $Mg(OH)_2$.

Referential Example 1

Table 1 shows the physical properties of polypropylene containing no flame retardant.

Referential Example 2

Table 2 shows the physical properties of nylon 6 containing no flame retardant.

EXAMPLE 9

A composite metal hydroxide was prepared in the same manner as in Example 2 except that the amount of the aqueous solution containing 2.0 mol/l of magnesium chloride was changed to 8 liters and that the surface treatment was carried out with 1.5% by weight, based on the resulting product, of a sodium salt of stearyl acid phosphate. The so-obtained composite metal hydroxide had the following chemical composition.

$$Ca_{0.60}Mg_{0.40}(OH)_2$$

The dried composite metal hydroxide was mixed with ethylene propylene diene rubber (EPDM) and other components as shown below, and melt-kneaded and formed into a sheet with an open roll at 150° C. The sheet was vulcanized with a pressing forming machine at 160° C. for 30 minutes to form a sheet, and test pieces were prepared from the sheet. Table 3 shows the results.

| | |
|---|---|
| EPDM | 100 parts by weight |
| Zinc oxide | 5 parts by weight |
| Promoter TT (tetramethyl thiuram disulfide) | 1.5 parts by weight |
| Sulfur | 0.5 part by weight |
| Stearic acid | 1.0 parts by weight | was carried out in the same manner as in Example 8. The so-obtained composite metal hydroxide had the following chemical composition.

$$Ca_{0.50}Mg_{0.40}Fe_{0.10}(OH)_2$$

The dried composite metal hydroxide was mixed with EPDM in the same manner as in Example 8, and test pieces were prepared. Table 3 shows the results.

TABLE 1

| | Amount of composite metal hydroxide (part by weight) | Flamma- bility (UL-94) | Tensile strength (kg·f/cm$^2$) | Izod impact strength (kg·cm/cm) | Appearance of molded article |
|---|---|---|---|---|---|
| Ex.1 | 180 | V-0 | 185 | 11.0 | Excellent |
| Ex.2 | 140 | V-0 | 197 | 13.6 | Excellent |
| Ex.3 | 140 | V-0 | 205 | 12.1 | Excellent |
| Ex.4 | 170 | V-0 | 180 | 10.2 | Excellent |
| Ex.5 | 170 | V-0 | 187 | 9.3 | Excellent |
| Ex.6 | 140 | V-0 | 211 | 10.7 | Excellent |
| CEx.1 | 170 | o.o.s. | 167 | 2.5 | A |
| CEx.2 | 200 | o.o.s. | 152 | 4.3 | Excellent |
| CEx.3 | 150 | V-0 | 198 | 11.8 | Excellent |
| REx.1 | — | o.o.s. | 280 | 9.6 | Excellent |

| | X-ray diffraction (crystal structure) | BET specific surface area (m$^2$/g) | Average secondary particle diameter (μm) | Dehydration decomposition temperature (°C.) |
|---|---|---|---|---|
| Ex.1 | Ca(OH)$_2$ | 4.9 | 1.81 | 501 |
| Ex.2 | Ca(OH)$_2$, Mg(OH)$_2$ | 5.7 | 1.55 | 520, 381 |
| Ex.3 | Ca(OH)$_2$, Mg(OH)$_2$ | 7.4 | 1.98 | 523, 380 |
| Ex.4 | Ca(OH)$_2$, | 7.7 | 0.84 | 514 |
| Ex.5 | Ca(OH)$_2$, | 9.8 | 0.78 | 502 |
| Ex.6 | Mg(OH)$_2$ | 12.0 | 0.68 | 396 |
| Ex.7 | Ca(OH)$_2$, | 5.5 | 1.94 | 500 |
| Ex.8 | Ca(OH)$_2$, Mg(OH)$_2$ | 7.9 | 1.47 | 385, 510 |
| Ex.9 | Ca(OH)$_2$, Mg(OH)$_2$ | 7.4 | 1.65 | 385, 515 |
| Ex.10 | Ca(OH)$_2$, Mg(OH)$_2$ | 8.1 | 2.00 | 381, 507 |
| CEx.1 | Ca(OH)$_2$, Ni(OH)$_2$ | 18.4 | 6.97 | 514, 309 |
| CEx.2 | Ca(OH)$_2$, | 3.1 | 1.96 | 536 |
| CEx.3 | Mg(OH)$_2$ | 7.2 | 0.83 | 420 |

Notes: Ex. = Example, CEx. = Comparative Example
REx. = Referential Example
A: flash patterns
o.o.s. = out of standard

TABLE 2

| | Amount of composite metal hydroxide (part by weight) | Flamma- bility (UL-94) | Tensile strength (kg·f/cm$^2$) | Izod impact strength (kg·cm/cm) | Appearance of molded article |
|---|---|---|---|---|---|
| Ex.7 | 70 | V-0 | 750 | 2.6 | Excellent |
| Ex.8 | 60 | V-0 | 810 | 2.8 | Excellent |
| CEx.4 | 80 | o.o.s. | 620 | 2.0 | Excellent |
| REx.2 | — | o.o.s. | 630 | 3.2 | Excellent |

Notes: Ex. = Example, CEx. = Comparative Example
REx. = Referential Example
o.o.s. = out of standard

Comparative Example 4

The same calcium hydroxide slurry as that used in Example 1 was surface-treated with 1% by weight, based on calcium hydroxide, of lauroyl sarcosine in the same manner as in Example 6, dried and mixed with nylon 6, and test pieces were prepared. Table 3 shows the results.

EXAMPLE 10

A composite metal hydroxide was prepared in the same manner as in Example 7 except that the mixed aqueous solution was replaced with 12 liters of a calcium chloride/magnesium chloride/ferrous chloride mixed aqueous solution (Ca$^{2+}$=2.0 mol/l, Mg$^{2+}$=0.8 mol/l, Fe$^{2+}$=0.1 mol/l) and that the surface treatment

TABLE 3

| | Amount of composite metal hydroxide (part by weight) | Flamma- bility (UL-94) | Tensile strength (kg·f/cm$^2$) | Tensile breaking elongation (%) |
|---|---|---|---|---|
| Ex.9 | 120 | V-0 | 102 | 41.0 |
| Ex.10 | 120 | V-0 | 105 | 40.0 |
| CEx.4 | 150 | o.o.s. | 76 | 38.0 |

Notes: Ex. = Example, CEx. = Comparative Example
REx. = Referential Example
o.o.s. = out of standard

What is claimed is:

1. A composite metal hydroxide which is a solid solution having the formula (1)

$$Ca_{1-x}M^{2+}{}_x(OH)_2 \qquad (1)$$

wherein M is at least one metal selected from the group consisting of Mg, Mn, Fe, Co, Ni, Cu and Zn, x is in the range of $0.001 \leq x < 0.995$, and the composite metal hydroxide is at least one of a calcium hydroxide solid solution comprising a solution of the metal in calcium hydroxide, a metal hydroxide solid solution comprising a solution of calcium in the metal hydroxide, and a mixture thereof.

2. A composite metal hydroxide which is a solid solution having the formula (1)

$$Ca_{1-x}Mg^{2+}{}_x(OH)_2 \qquad (2)$$

wherein M is the range of $0.001 \leq x < 0.995$, and the composite metal hydroxide is at least one of a calcium hydroxide solid solution comprising a solution of magnesium in calcium hydroxide, a magnesium hydroxide solid solution comprising a solution of calcium in magnesium hydroxide, and a mixture thereof.

3. A composite metal hydroxide having the formula (3)

$$Ca_{1-x}(Mg, Ni, Mn)_x(OH)_2 \qquad (3)$$

wherein M is the range of $0.001 \leq x < 0.995$, the composite metal hydroxide contains magnesium and at least one of Ni and Mn, and the composite metal hydroxide is at least one of a calcium hydroxide solid solution comprising magnesium and at least one of Ni and Mn in calcium hydroxide, a magnesium hydroxide solid solution comprising a solution of calcium and at least one of Ni and Mn in magnesium hydroxide, and a mixture thereof.

* * * * *

UNITED STATES PATENT AND TRADEMARK OFFICE
CERTIFICATE OF CORRECTION

PATENT NO. : 5,422,092
DATED : June 6, 1995
INVENTOR(S) : Shigeo MIYATA

It is certified that error appears in the above-indentified patent and that said Letters Patent is hereby corrected as shown below:

Column 13,
Claim 2, line 1, delete "which is a solid solu-";

line 2, delete "tion"; change "formula (1)" to --formula (2)--;

line 4, change "wherein M is the" to --wherein x is in the--.

Column 14,
Claim 3, line 4, change "wherein M is the" to --wherein x is in the--.

Signed and Sealed this

Nineteenth Day of December, 1995

Attest:

BRUCE LEHMAN

Attesting Officer

Commissioner of Patents and Trademarks